No. 864,919. PATENTED SEPT. 3, 1907.
C. R. ROSS.
ADJUSTABLE HOSE NOZZLE.
APPLICATION FILED AUG. 24, 1906.

2 SHEETS—SHEET 1.

Witnesses:

Inventor:
Charles R. Ross
By F. G. Fischer
Atty

No. 864,919. PATENTED SEPT. 3, 1907.
C. R. ROSS.
ADJUSTABLE HOSE NOZZLE.
APPLICATION FILED AUG. 24, 1906.

2 SHEETS—SHEET 2.

Witnesses:

Inventor:
Charles R. Ross
By F. G. Fischer
Atty.

THE NORRIS PETERS CO., WASHINGTON, D. C.

UNITED STATES PATENT OFFICE.

CHARLES R. ROSS, OF KANSAS CITY, MISSOURI, ASSIGNOR OF ONE-THIRD TO ADA E. STREETER, OF KANSAS CITY, MISSOURI.

ADJUSTABLE HOSE-NOZZLE.

No. 864,919.  Specification of Letters Patent.  Patented Sept. 3, 1907.

Application filed August 24, 1906. Serial No. 331,826.

*To all whom it may concern:*

Be it known that I, CHARLES R. ROSS, a citizen of the United States, residing at Kansas City, in the county of Jackson and State of Missouri, have invented certain new and useful Improvements in Adjustable Hose-Nozzles, of which the following is a specification.

This invention relates to improvements in adjustable nozzles, and relates more particularly to that style used in connection with fire hose.

My object is to provide an adjustable nozzle, so that the water in flowing therethrough may be discharged either in a central stream, or in the form of spray; or, when desired, the nozzle may be adjusted to discharge the water in a central stream and in the form of spray at the same time.

Figure 1:
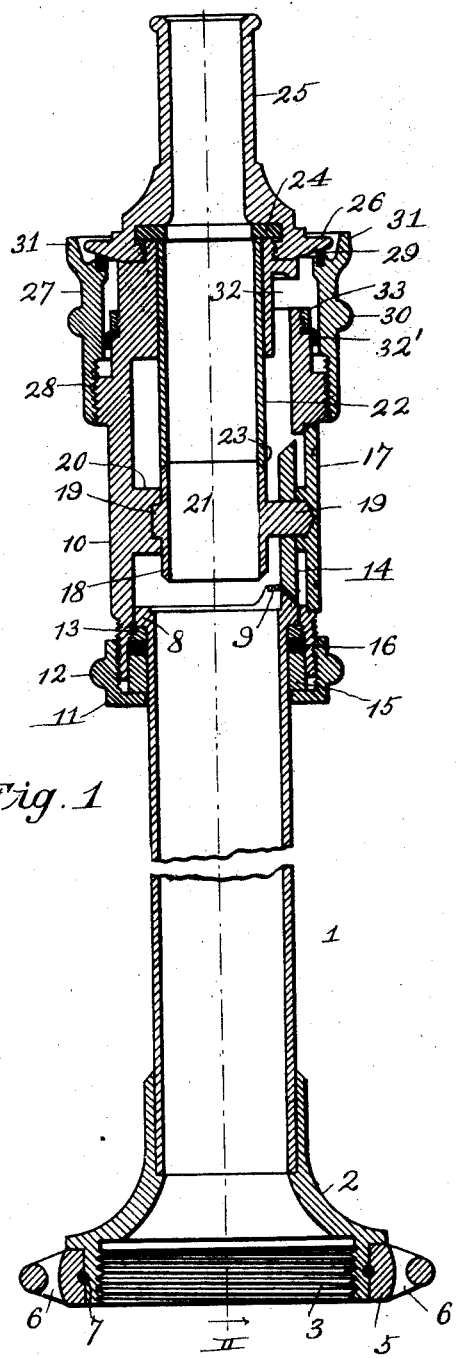
Figure 2:
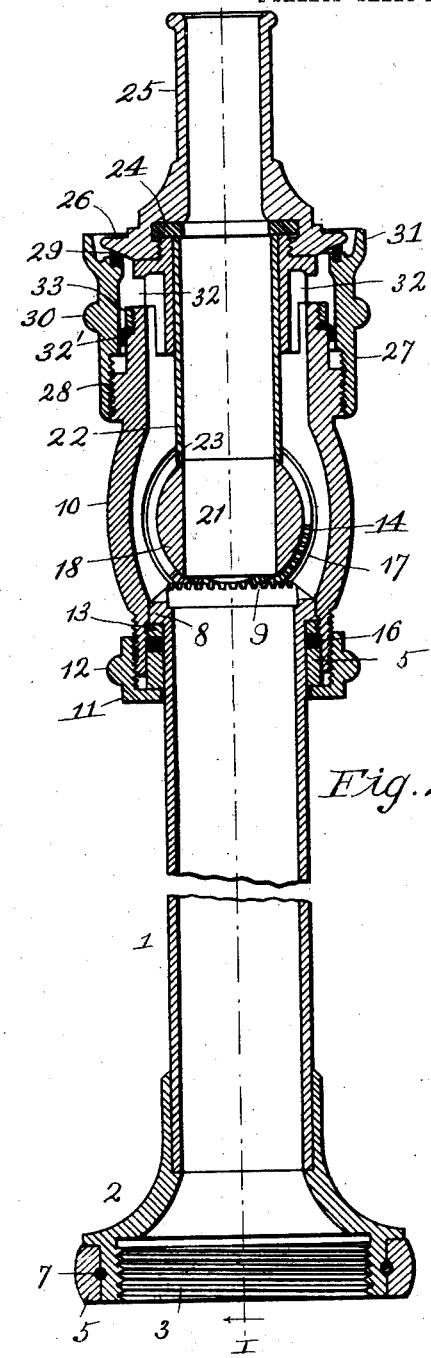
Figures 3, 4, 5, 6:
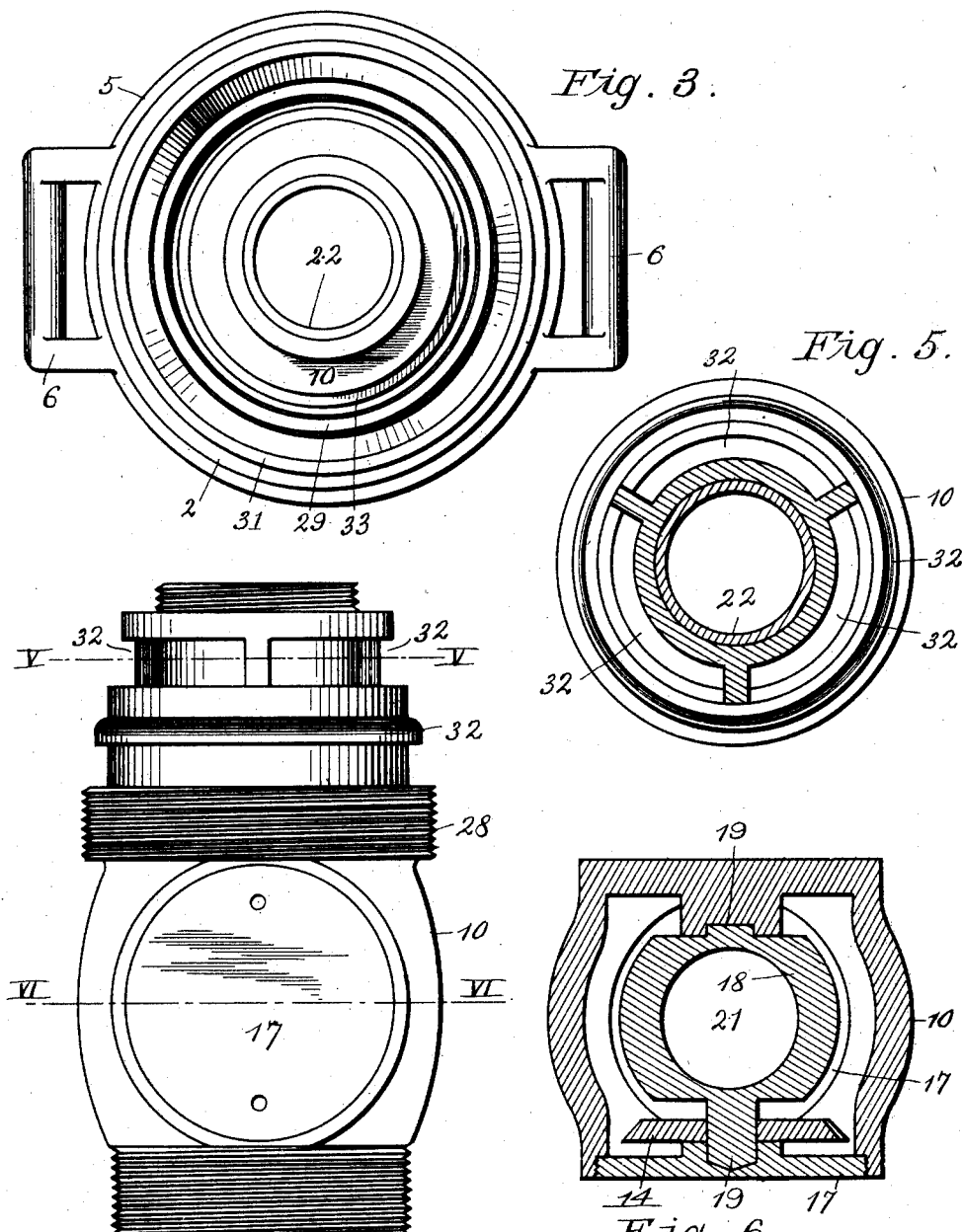

The invention consists in the novel construction, combination and arrangement of parts hereinafter described, pointed out in the claim and illustrated in the accompanying drawings, in which:

Figure 1 represents a longitudinal section taken on line I of Fig. 2. Fig. 2 is a longitudinal section taken on line II of Fig. 1. Fig. 3 is a plan view of the nozzle with its tip removed. Fig. 4 is a side elevation of a valve case, forming part of the invention. Fig. 5 is a transverse section of same taken on line V V of Fig. 4. Fig. 6 is a transverse section taken on line VI VI.

In carrying out the invention, I employ a tubular stem 1 having a bell shaped rear terminal 2, provided with internal screw threads 3 for the reception of the hose coupling not shown.

5 designates a ring swiveled upon said bell-shaped terminal and provided with a pair of oppositely disposed loops 6, this said ring being held in position by a wire band 7 fitting in registering grooves in the ring and the bell-shaped terminal. The forward end of stem 1 is provided with a marginal flange 8, having bevel gear teeth 9 extending around about one-quarter of its circumference.

10 designates a valve casing threaded at its rear end for the reception of a packing nut 11, having a knurled annular shoulder 12 whereby said packing nut may be adjusted.

13 designates an annular clamping nut engaging internal threads in the rear end of the valve casing and adjusted against the rear side of flange 8, in order to hold teeth 9 in mesh with the teeth of bevel gear 14.

15 designates an annular bushing which is forced by the clamping nut against a packing ring 16, interposed between the bushing and nut 13 for the purpose of forming a water tight joint between the forward end of the stem and the rear end of the casing 10, which latter is swiveled upon the stem.

One side of casing 10 is provided with an opening normally closed with a threaded disk 17, so that a ball-plug 18 may be placed within the casing, for the purpose of regulating to a certain extent the flow of water through the nozzle. Plug 18 is provided with trunnions 19 journaled in disk 17 and in a bearing 20 which latter projects inward from one side of the casing. Bevel gear 14 above referred to, is fixed upon one of said trunnions, as shown more clearly in Fig. 1.

Plug 18 is provided with a centrally-disposed port 21, extending diametrically there through and adapted to communicate with a bushing 22, provided at its rear terminal with a plug seat 23 and bearing at its forward end against a packing ring 24. Packing ring 24 also contacts with the forward end of casing 10, it being held in position by a removable tip 25, screwed upon the reduced forward end of said casing. Tip 25 is provided at its enlarged rear end with a marginal flange 26, having a beveled under surface for the purpose of assisting in converting the stream into a spray, as hereinafter more fully described.

27 designates a sleeve having internal threads at its rear end which adjustably engage external threads 28 on casing 10, so that a packing ring 29, carried in the forward end of the sleeve may be forced into contact with the beveled side of flange 26 or withdrawn therefrom by turning the sleeve in the proper direction, said sleeve being provided with a knurled, peripheral shoulder 30, which forms a convenient grip for the operator.

The forward terminal 31 of sleeve 27 flares outwardly and is slightly larger in diameter than flange 26, so that when the sleeve is adjusted rearwardly to leave an opening between said flange and packing 29, the spray will be discharged from said opening in funnel form.

The forward end of casing 10 is provided with ports 32 to establish communication between the sleeve 27 and the interior of said casing outside its bushing 22.

When it is desired to have the water discharge in a central stream, sleeve 27 is adjusted forwardly, until packing 29 is forced into contact with flange 26, thus cutting off the flow of water between said packing and the flange. Casing 10 is then turned until the intermeshing gear teeth bring the port 21 of the ball plug 18 into alinement with bushing 22 so that the water may pass therethrough and be discharged from tip 25. If desired, part of the stream may be converted into spray by adjusting the sleeve 27 backward, so that a portion of the water which flows around plug 18 and bushing, may pass through ports 32 and escape between packing 29 and flange 26. Should it be desirable to cut off the central stream, this may be instantly done by turning the valve casing until ball plug 18 is closed, without affecting the discharge of spray around flange 26.

32' designates a packing ring interposed between the forward portion of casing 10 and sleeve 27 to prevent a portion of the water from escaping around threads 28, said packing being held in position by a clamping nut 33.

When the casing is turned, the tubular stem, of course, will be held stationary by the hose, so that teeth 9 will cause the bevel gear 14 to rotate.

By providing a swiveled ring 5 with loops 6, straps may be attached to the latter to afford convenient grips, so that, should the hose be twisted when the water is turned on, the tubular stem 1 may turn therewith without affecting the grip upon the straps; hence one man may control the nozzle, whereas it requires from two to three men to hold the ordinary nozzle.

Having thus described my invention, what I claim and desire to secure by Letters-Patent, is:—

In a nozzle, the combination with a tubular casing having an opening in one side and a bearing projecting inward from the other side, an axial bushing in the casing having a plug seat at its lower end, an adjustable sleeve surrounding the casing, and a flange on the casing against which said sleeve may be closed; of a disk removably fitting the opening in the casing and itself having a bearing, a ball-plug of less external diameter than the interior of the casing, trunnions on the plug engaging said bearings, a bevel-gear fast on the trunnion adjacent said disk, a stem swiveled to the casing below and out of contact with the plug, and teeth on the stem engaging said bevel-gear.

In testimony whereof I affix my signature, in the presence of two witnesses.

CHARLES R. ROSS.

Witnesses:
 F. G. FISCHER,
 WM. A. LINGLE.